Sept. 3, 1963　　　F. BIEDERMANN ET AL　　　3,102,463
PHOTOGRAPHIC COPYING DEVICE
Filed Jan. 31, 1958　　　　　　　　　　　　　3 Sheets-Sheet 1

INVENTORS
Friedrich BIEDERMANN
Richard WICK
BY
Michael S. Striker
Attorney

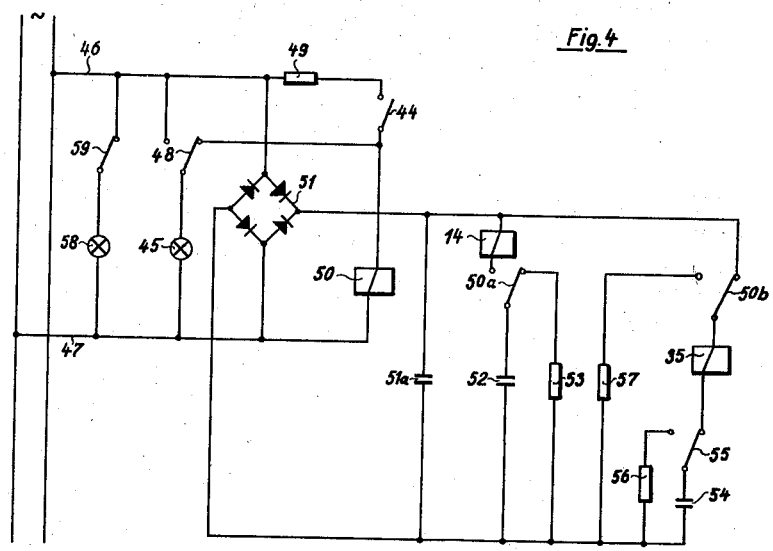

Sept. 3, 1963  F. BIEDERMANN ET AL  3,102,463
PHOTOGRAPHIC COPYING DEVICE
Filed Jan. 31, 1958  3 Sheets-Sheet 3
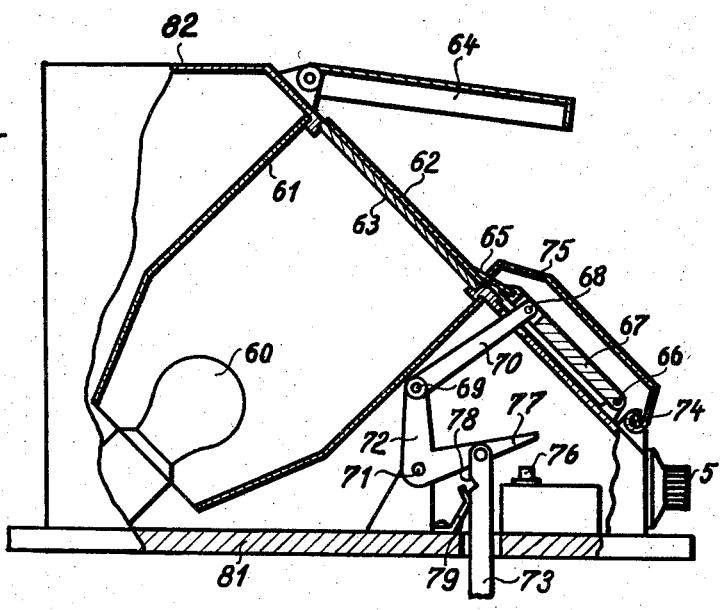
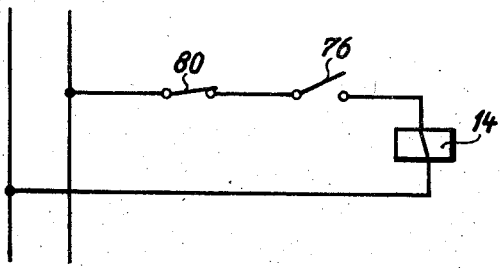
INVENTORS
Friedrich BIEDERMANN, Richard WICK
BY

United States Patent Office 3,102,463
Patented Sept. 3, 1963

3,102,463
PHOTOGRAPHIC COPYING DEVICE
Friedrich Biedermann, Unterhaching, near Munich, and Richard Wick, Munich, Germany, assignors to Agfa Aktiengesellschaft, Leverkusen, Germany
Filed Jan. 31, 1958, Ser. No. 712,571
Claims priority, application Germany Feb. 7, 1957
10 Claims. (Cl. 95—73)

The present invention relates to photographic copying devices such as photographic enlargers.

In devices of this type it is necessary for the operator to adjust several parts before a proper copy of a transparency can be made. (In this specification and the claims which follow the term "transparency" signifies not only color transparencies, but also a black and white negative.) For example, where the device includes an automatic exposure control which is adjusted in accordance with the average density of the transparency, it may be necessary to adjust the control further in the case where important parts of the transparency have a light density substantially different from the average density, and adjusting devices for making such adjustments are known. It is also known to provide a means for automatically returning such an adjusting device to a zero or rest position after each exposure. Therefore, with such a construction it is necessary to reset such an adjusting device for each exposure, and this requirement creates considerable inconvenience in the case where a series of identical copies of the same transparency are to be made, because the adjusting device requires resetting for each copy even though no other adjustments of the device are required.

The manual operations required for a conventional photographic copying device are still considerable and create inconveniences and time consuming operations.

One of the objects of the present invention is to provide a photographic copying device which includes structures for automatically operating different parts of the device in the proper sequence so as to greatly decrease both the required manual operations as well as the possibility of error, as compared to conventional photographic copying devices.

It is also an object of the present invention to provide in a photographic copying device which requires a plurality of operations to be performed when a transparency is newly placed in the device a means which will automatically perform one of these operations when another of these operations is carried out.

A further object of the present invention is to provide a photographic copying device which will automatically reset an adjuster of the exposure control to its zero position only when one transparency is exchanged for another, so that any desired number of identical copies may be made from the same transparency without the necessity of resetting such an adjuster after each exposure as is required at the present time in known copying devices.

It is also an object of the present invention to provide a photographic copying device with a means which will automatically move the holder of the light-sensitive copy paper to a rest position permitting the exposed copy to be removed after an exposure is made.

With the above objects in view the present invention includes in a photographic copying device a pair of means which are required to be operated when one transparency is exchanged for another. In accordance with the present invention one of these means, when it is operated in connection with the placing of another transparency in the device, automatically actuates at least part of the other means.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

FIG. 4 is a wiring diagram of the arrangement of the present invention;

FIG. 5 is a fragmentary partly sectional elevational view of a different embodiment of the present invention where the present invention is applied to a copying device which makes contact copies; and FIG. 6 shows part of the electric circuit used with the structure of FIG. 5.

Figure 1:
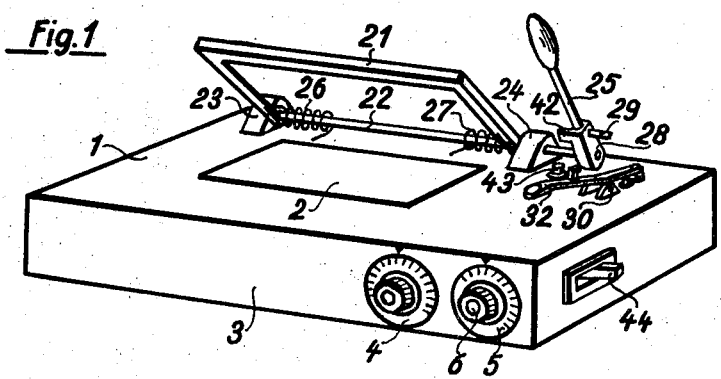
FIG. 1 is a perspective view of a copying frame of a photographic enlarger.

FIG. 1 shows the housing-like copy frame 1 of a photographic copying device in the form of an enlarger which is not further illustrated. The frame 1 forms a support for the light-sensitive copy sheet which is located on the top wall of the support 1. This support 1 is located on the base plate of the enlarger and its top wall is formed in part by the plate 2 through which light is capable of passing and which serves as a support for the light-sensitive copy paper. Beneath the plate 2 is located a photoelectric cell of a known and unillustrated exposure control device. This photoelectric cell receives the light which passes through the copy sheet and the plate 2 and automatically turns off the lamp of the enlarger as soon as a predetermined amount of light has impinged on this photoelectric cell of the control device.

The side wall 3 of the support 1 is provided with a pair of manually turnable knobs 4 and 5 which are turned to adjust a pair of unillustrated potentiometers, respectively, located in the circuit of the exposure control device, these potentiometers being adjusted in such a way that the light source is deenergized automatically when a preselected amount of light has impinged on the photoelectric cell. The knob 4 is turned to adjust the control in accordance with the sensitivity of the particular copy paper which is used, while the knob 5 is turnable in both directions from a zero position in order to correct the setting of the automatic exposure control device so as to take care of those instances where the transparency includes important portions whose light density differs substantially from the average density for which the automatically controlled exposure time is set. Thus, the knob 5 is turned to increase or decrease the exposure time with respect to the exposure time required for the average density of the transparency in those cases where the transparency includes significant parts whose density differs from the average density.

Figure 2:
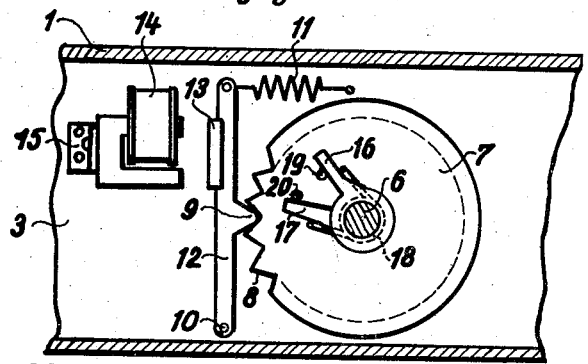
FIG. 2 is a fragmentary partly sectional elevational view illustrating part of an automatic return structure located within the housing-like frame of FIG. 1.

As may be seen from FIG. 2, in the interior of the housing which forms the support 1 there is a shaft 6 to which the knob 5 is fixed so that the shaft 6 is turned upon turning of the knob 5, and this shaft 6 fixedly carries a toothed disc 7. A projection 9 extends into the teeth 8 of the disc 7, and this projection 9 forms part of a lever 12 turnable about a stationary pin 10 and urged by the spring 11 toward the disc so that the spring 11 urges the tooth 9 into engagement with the teeth 8. Thus, the toothed disc 7 and spring-urged lever 12 cooperate to minain the shaft 6 and the knob 5 in the angular position to which they have been turned by the operator. The lever 12 carries an armature 13 which cooperates with an electromagnet 14 carried by a bracket 15 which is fixed to the wall 3 of the housing. When knob 5 is manually turned the teeth 8 of the disc 7 cause movement of projection 9 out of the teeth 8 against the action of spring 11. As soon as one of the teeth 8 has passed the projection 9, the lever 12 with its projection 9 returns into the next-following gap between the teeth 8 of disc 7 by action of the spring 11.

A pair of arms 16 and 17 are freely turnable on the shaft 6 and a wire spring 18 is coiled about the shaft 6 and has a pair of free ends respectively engaging the arms 16 and 17 in the manner shown in FIG. 2 for urging these arms toward each other in a manner which decreases the angle included therebetween. The arms 16 and 17 respectively engage the pins 19 and 20 which are respectively fixed to the disc 7 and the support 1. Thus, the spring 18 urges the knob 5 to a zero position, when the lever 12 is turned away from the disc 7, where the pin 19 is located along a straight line in the plane of FIG. 2 which interconnects the axis of the shaft 6 with the axis of the stationary pin 20.

A copy sheet holder 21, which is only shown schematically in FIG. 1 and which can be provided with masks, is turnably supported by the shaft 22 for movement downwardly from the rest position shown in FIG. 1 to a position next to the top wall of the support 1 for holding the copy sheet in place. The shaft 22 extends parallel to the top surface of the support 1 and is carried by a pair of bosses 23 and 24 which are fixed to the top surface of the support 1. The holder 21 is fixed to the shaft 22 for turning movement therewith and this shaft 22 is turnably supported by horizontal bores formed in the bosses 23 and 24. The shaft 22 extends through and beyond the boss 24, and at its end beyond the boss 24 the shaft 22 is fixedly connected with a manually operable lever 25 which is engaged by the operator and turned downwardly in a counterclockwise direction, as viewed in FIG. 3, for moving the holder 21 from its rest to its holding position. A pair of springs 26 and 27 are coiled about the shaft 22 and engage the holder 21 and the top surface of the support 1 for urging the holder 21 upwardly from its holding position to its rest position, and any suitable stops may be provided for determining the rest position of the holder 21. The operator upon engaging the lever 25 turns the holder 21 downwardly to its holding position against the force of the springs 26 and 27.

A latching means is carried by the support 1 and cooperates with the lever or arm 25 for releasably holding the holder 21 in its holding position. This latching means includes a latch member 29 fixedly carried by a free end portion 28 of the lever 25. The support 1 fixedly carries at its top surface a pivot pin 30 which tiltably supports an elongated tilt member 32 urged by the spring 31 (FIG. 3) to turn about the pivot 30 in a clockwise direction. This tilt member 32 fixedly carries a latch hook 33 which automatically engages the latch member 29 to cooperate therewith in the manner shown in FIG. 3 for releasably holding the holder 21 in its holding position, when the lever 25 is turned downwardly by the operator. In order to release the latch means, the left end of the tilt member 32, as viewed in FIG. 3, is provided with a key 34 which is pressed downwardly by the operator to turn the tilt member 32 in a counterclockwise direction, as viewed in FIG. 3, against the force of the spring 31, so as to turn the hook member 33 away from the latch member 29 and thus release the holder 21 to the springs 26 and 27 which form a moving means for moving the holder from its holding back to its rest position.

Figure 3:
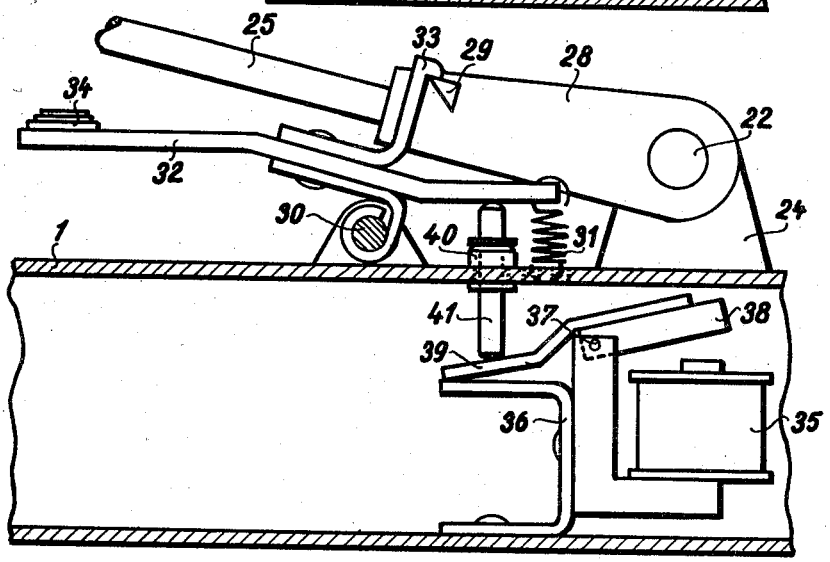
FIG. 3 is a fragmentary partly sectional side elevational view showing the latching and releasing structure for releasably holding the light-sensitive copy sheet on the support of FIG. 1.

Also, as is shown in FIG. 3, an electromagnetic means may be provided for releasing the latch means, and this electromagnetic means includes the electromagnet 35 which is mounted in the interior of the housing 1 on a suitable carrying device 36 which also carries a pivot pin 37 on which an armature 38 is pivotally supported to be pulled downwardly toward the electromagnet 35 when the latter is energized. A member 39 is fixed to the armature 38 and extends leftwardly beyond the same, as viewed in FIG. 3, to engage the bottom end of a motion transmitting pin 41 which extends slidably through a sleeve 40 which is carried by a top wall of the support 1 in an opening of this top wall. The top end of the pin 41 engages the underside of the tilt member 32 in the manner shown in FIG. 3. Thus, when the electromagnet 35 is energized the armature 38 together with the member 39 will be turned about the pivot pin 37 in a clockwise direction, as viewed in FIG. 3, to raise the pin 41 which, during its upward movement, turns the tilt member 32 in a counterclockwise direction, as viewed in FIG. 3, so as to release the latch means.

The torque applied to the shaft 22 by the operator through the lever 25 is sufficiently large to permit the shaft 22 to twist slightly and then the operator presses the lever 25 downwardly beyond the position it has reached when the holder 21 is located in its holding position. Such further turning of the arm 25 causes a projection 42 fixed thereto to engage and close a switch 43 (FIG. 1). This switch 43 when it closes starts the operation of the exposure control device and starts the exposure itself.

The support 1 also carries a manually operable switch 44 which is used for turning on and off a lamp which provides the light for examining a transparency. The light source for examining purposes is preferably the same as the light source used for the actual exposure.

This lamp which is used both for exposure and examining purposes is indicated at 45 in the wiring diagram of FIG. 4. As may be seen from FIG. 4 the electrical circuit includes the leads 46 and 47 which connect the lamp 45 with the usual source of alternating current. The circuit provided by the leads 46 and 47 with the lamp 45 includes the switch 44 for actuating the examining light as well as a resistor 49. A relay 50 is connected in parallel with the lamp 45 and switch 48.

Also, the leads 46 and 47 are connected through a rectifier 51, which cooperates with a filter condenser 51a, to the electromagnet 14 of the adjuster of the exposure control, this adjuster being shown in FIG. 2 and described above. The magnet 14 is connected in series with a condenser 52 through a switch 50a which is controlled by the relay 50. The switch 50a can turn to the position of FIG. 4 where it connects the resistor 53 with the condenser 52.

The circuit of the rectifier 51 further includes the electromagnet 35 described above in connection with FIG. 3 which serves to release the holder 21 for movement to its rest position. This magnet 35 is connected in series with a switch 50b which is also controlled by the relay 50, and the magnet 35 is connected through switch 55 with a condenser 54 which is capable of being connected with a resistor 56 when the switch 55 is turned to the left from the position shown in FIG. 4. A further resistor 57 is provided to be connected into the circuit of the magnet 35 and condenser 54 when the switch 50b is pulled to the left, as viewed in FIG. 4, by the relay 50.

A darkroom lamp 58 together with its switch 59 are connected in parallel with the lamp 45. The switches 48, 55 and 59 are controlled through a common relay of the unillustrated exposure control device.

The above described structure operates as follows:

After a given copying process has been completed the movable parts of the device and the electrical circuit take the position shown in FIGS. 1, 2 and 4, and it will be seen that during this previous operation the knob 5 was located away from its zero position at a certain setting for adjusting the exposure control device. The lever 12 holds the disc 7 at the angular position to which it was previously turned by the knob 5.

The previously copied transparency is removed and the next transparency which is to be copied is placed on the unillustrated transparency carrier of the enlarger. Then, without placing a copy sheet on the support 1, the lever 25 is turned downwardly to locate the holder 21 in its holding position in which it is held by the latch 29, 33. To examine the transparency which has been newly placed in the copying device the operator closes the switch 44 so as to energize the lamp 45. It will be noted from FIG. 4 that at this time the resistor 49 is located in the circuit of the lamp 45 so that it does not provide a light which is as intense as that provided with the lamp 45 is used for the actual exposure. It will be noted that the closing of the switch 44 simultaneously energizes the relay 50 which pulls the switches 50a and 50b to the left, as viewed in FIG. 4. As a result the condenser 52 becomes charged. During charging of condenser 52 a charging current flows through the winding of the electromagnet 14 and therefore said magnet 14 is energized. Thus the magnet 14 pulls the armature 13 to turn the lever 12 away from the disc 7, and in this way the spring 18 returns the exposure control adjusting device to its zero position. As soon as the charging of condenser 52 is completed, the flow of a charging current through the winding of the electromagnet 14 is terminated and, therefore, the magnet 14 is deenergized although switch 50a remains in its left hand position. Thereafter, if necessary, the knob 5 which has returned to its zero position during charging of condenser 52, may be turned to provide a new adjustment of the exposure control device in accordance wiith the density distribution of the transparency which is now in the device. Since the condenser 52 remains in its charged condition and, therefore, the magnet 14 is without current, the knob 5 and the remainder of the adjusting device remains in the position in which it has been newly placed by the operator, the lever 12 cooperating with the disc 7 for releasably holding the adjusting device in this position.

Also, the movement of the switch 50b by above mentioned energization of the relay 50 discharges the condenser 54 through the magnet 35 and the resistor 57. The resistor 57 is so great that the magnet 35 is not energized and does not pull the armature 38.

When the operator opens the switch 44 so as to turn off the examining light, this switch 44 is again in the position shown in FIGS. 1 and 4 so that the current supply to the relay 50 is cut off and the switches 50a and 50b automatically return to their starting position shown in FIG. 4. As a result the condenser 52 is discharged through the resistor 53 and without energization of magnet 14, while the condenser 54 is again charged through the magnet 35. The current charging the condenser 54 and flowing through the winding of the electromagnet 35 momentarily energizes this magnet which thus, at this time, pulls the armature 38 to cause the latch means to be automatically released in the above described manner so that the holder 21 automatically moves to its rest position. As soon as the charging of condenser 35 has terminated, magnet 35 is deenergized.

Now, the light-sensitive copy sheet is placed on the plate 2 and the holder 21 is again moved to its holding position, whereupon the full downward movement of the lever 25 causes the projection 42 thereof to close the switch 43 and thus start the exposure of the copy sheet as well as the operation of the exposure control device. The switches 48, 55 and 59 are now pulled to the left, as viewed in FIG. 4, by a relay of the exposure control device, so that the darkroom lamp 58 is turned off and the lamp 45 is energized without the resistor 49 being in its circuit, and at the same time the condenser 54 is discharged through the resistor 56. At the end of the exposure period which is automatically controlled by the exposure control device the switches 48, 55 and 59 automatically return to the positions thereof respectively shown in FIG. 4, whereupon the condenser 54 is again charged through the magnet 35 so as to cause this magnet 35 to again become momentarily energized and thus automatically release the latching means so that the the adjusting structure of FIG. 2 is not returned to its zero position at this time, any desired number of copies of the transparency in the device may be made without further setting of the knob 5. Only when the transparency is exchanged, so as to require the switch 44 to be closed again, does the knob 5 return automatically to its zero position. Thus, the switch 44 forms an operator controlled device required to be operated in connection with the placing of a new transparency in the copying device, and the operation of the device 44 results in automatic actuation of the return means formed in part by the structure of FIG. 2 for returning this structure to its zero position.

The adjusting structure of FIG. 2 can be returned to its zero position, also through operation of a device other than the switch for energizing the lamp which provides the transparency examining light. For example, when the above-described structure forms part of a contact copy device, a movable element which holds the transparency in place may be used to energize the relay 50 for causing the magnet 14 forming also part of the return means to become momentarily energized so as to free the spring 18 for returning the parts 5—7 to their zero position. Such a construction is shown in FIG. 5.

As may be seen from FIG. 5 the plate 81 carries the housing 82 of a contact copy device. The copy lamp 60 is located in the light tube 61 at the top end of which is located the plate 63 through which the light can pass and which serves as a support for the transparency 62. The turnable holder 64 for the copy sheet is located over the plate 63, and this holder 64 can carry the photoelectric cell of the exposure control device. Adjacent the lower edge of the plate 63, as viewed in FIG. 5, is located the springy strip 65 which presses resiliently against the transparency 62 for holding the latter in position, and this strip 65 is carried by the carrier 67 which is turnably supported on the housing 82 by the pivot pin 66 and which is pivotally connected by a pin 68 with a link 70 whose end distant from carrier 67 is pivotally connected by pin 69 with one end of a bellcrank 72 supported for turning movement on the stationary pin 71. The arm of the bell crank 72 which is not connected to the link 70 is connected with a bar 73 capable of being moved up and down by the operator through actuation of an unillustrated foot pedal connected with the bar 73 which extends through an opening of the support plate 81. A member 75 is turnably supported by a pin 74 carried by the housing 82 for turning movement over carrier 67 and strip 65 to and from the position shown in FIG. 5 where the element 75 serves as a stop for the copy sheet. The knob 5 is mounted on an end wall of the housing 82 and is connected with the above-described structure of FIG. 2 in the manner described above.

In order to energize the magnet 14 of the return means for returning the adjusting structure to its zero position, the embodiments of FIGS. 5 and 6 includes the switch 76 instead of the switch 44. As is shown in FIG. 6 this switch is located in the circuit of the magnet 14. The switch 76 is actuated by the arm 77 of the bell crank 72 when the bar 73 is moved downwardly in order to raise the strip 65, and when the bar 73 is moved downwardly through such a distance that the notch 78 of the bar 73 moves downwardly beyond the spring 79, which is to say downwardly beyond the position where the bar 73 would be held by cooperation of the spring 79 with the notch 78. In the event that it is desired to maintain the adjustment set by the knob 5 when changing one transparency for another, then the bar 73 is only moved down until the spring 79 enters into the notch 78, and with the bar 73 held in this position by the spring 79 the arm 77 of the bell crank 72 does not actuate the switch 76. In order to deactivate the entire adjusting device set by the knob 5 the circuit of the magnet 14 includes a normally closed switch 80 which can be opened to cut off the flow of current in this circuit.

Other devices which form part of the photographic copying device may be used to control the switches 50a and 50b instead of the switch 44 or the switch 76 instead of the strip 65, as long as the devices used for this purpose are required to be operated when the transparency is changed. For example, a movable part of the transparency carrier of the enlarger may be used in place of switch 44 to control switches 50a and 50b or in place of the strip 65 to control the switch 76.

Of course, the adjusting structure of FIG. 2 together with the knob 5 for setting the same can be located in an additional housing which, for example, forms part of the exposure control device, instead of in the housing which forms the support 1 or in the housing 82 in the case of the embodiment of FIG. 5.

It will be understood that each of the elements described above, or two or more together, may also find a useful application in other types of photographic copying devices differing from the types described above.

While the invention has been illustrated and described as embodied in an adjustable photographic copying device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a photographic copying device, in combination, a light source for illuminating a transparency placed on the photographic copying device;

manually adjustable timing means adjustable between a zero position and a plurality of adjusted positions;

return means operatively connected to said manually adjustable timing means for returning the latter from any one of said adjusted positions to said zero position;

holding means movable between an inoperative position and an operative position engaging a light sensitive printing material placed on said copying device, said holding means including a support for the light sensitive printing material, a holder movably carried by said support for movement between a rest position and a holding position holding the light sensitive printing material on said support, latch means carried by said support and cooperating with said holder for releasably latching the same in said holding position, electromagnetic means cooperating with said latch means for actuating the latter to release said holder upon energizing of said electromagnetic means, and moving means cooperating with said holder for moving the latter automatically to said rest position thereof when said latch means is released;

and switch means electrically connected with said light source and said return means to automatically return said timing means to said zero position upon closing of said switch means and said electromagnetic means of said holding means being electrically connected to said switch means to be energized upon opening of said switch means so that said holder being moved from said holding to said rest position upon opening of said switch means.

2. In a device as recited in claim 1, said latch means including an arm movable with said holder and carrying a latch member and a hook member pivotally carried by said support for automatically engaging said latch member when said holder is in said holding position thereof to prevent said moving means from moving said holder back to said rest position thereof, said electromagnetic means including an electromagnet, an armature pivotally supported adjacent said magnet to be turned when the latter is energized, and a pin extending between said armature and hook member for turning the latter to release said latch member when said armature turns upon energizing of said electromagnet.

3. In a device as recited in claim 2, said support being in the form of a housing having a top wall on which said holder and latch means are located, said electromagnetic means being located within said housing and said pin extending from the armature in said housing through said top wall into engagement with said hook member on said top wall.

4. In a device as recited in claim 1, said holder being turnably supported on said support for movement between said rest and holding positions and a manually operable lever connected to said holder for turning movement therewith to be engaged by the operator for moving said holder to said holding position thereof, said latch means cooperating with said lever for releasably holding said holder in said holding position thereof.

5. In a photographic copying device, in combination, manually operable adjusting means adjustable by the operator from a rest position for adjusting a device which controls the exposure of a light-sensitive copy sheet; return means operatively connected with said manually operable adjusting means for returning the same to said rest position, said return means including an electromagnet which is energized to actuate said return means, and a switch connected in the circuit of said electromagnet for energizing the latter; a support for the transparency which is to be copied; holding means movably carried by the support and cooperating therewith for holding a transparency in a proper position on said support; and actuating means coupled to said holding means and actuating said switch during movement of said holding means for energizing said electromagnet when one transparency held by said holding means is changed for another.

6. A photographic copying device comprising, in combination, support means for supporting a transparency during copying thereof;

copying means for making successively copies of a transparency supported by said support means, said copying means including a light source for illuminating a transparency supported on said support means;

manually adjustable timing means adjustable between a zero position and a plurality of adjusted positions;

return means operatively connected to said manually adjustable timing means for returning the latter from any one of said adjusted positions thereof to said zero position;

an operator controlled mechanism located in said copying device movement of which is required each time a transparency is placed on said support means and before at least one copy thereof is made by said copying means;

and actuating means operatively connected to and operated by said operator controlled mechanism during movement thereof and actuating during such movement said return means for returning said manually adjustable timing means from any one of said adjusted positions thereof to said zero position each time said mechanism is moved a predetermined distance, said actuating means being independent of said copying means so as to permit successively making of copies of one and the same transparency supported on said support means without return of said manually adjustable timing means by said return means to said zero position.

7. An arrangement as defined in claim 6 in which said operator controlled mechanism is constituted by holding means movably carried by said support means and cooperating therewith for holding a transparency in proper position on said support means and operated each time a transparency is placed on said support means and in which said actuating means is coupled to said holding means and engages part of said return means for actuating the latter during operation of said holding means so as to return said manually adjustable timing means from any one of the adjusted positions thereof to said zero position.

8. An arrangement as defined in claim 7 in which said holding means is movable between an inoperative position and an operative position engaging a transparency placed on said support means, in which said actuating means is movable between two positions thereof and in which during movement of said actuating means from one to the other of said two positions thereof said holding means is moved from said operative to said inoperative position and said return means is actuated for returning said manually adjustable timing means from any one of said adjusted positions thereof to said zero position.

9. An arrangement as defined in claim 7 in which said holding means is movable between an inoperative position and an operative position engaging a transparency placed on said support means and in which said actuating means is movable from a rest position over a first actuating position to a second actuating position and in which during movement of said actuating means from said rest to said first actuating position, said holding means is moved from its operative to its inoperative position, while during the movement of said actuating means from said first to said second actuating position said actuating means engages part of said return means for actuating the latter so as to return said manually adjustable timing means from any one of the adjusted positions thereof to said zero position.

10. An arrangement as defined in claim 6 in which said mechanism is constituted by a switch electrically connected to said light source for energizing the latter when said light source is used for examining a transparency placed on said suport means and in which said actuating means include switch means electrically connected to said switch and said return means for actuating the latter to automatically return said manually adjustable timing means to said rest position thereof upon closing of said switch.

References Cited in the file of this patent

UNITED STATES PATENTS

| | | |
|---|---|---|
| 1,602,051 | Sharp | Oct. 5, 1926 |
| 2,158,903 | Knobel | May 16, 1939 |
| 2,561,243 | Sweet | July 17, 1951 |
| 2,614,453 | MacArthur | Oct. 21, 1952 |
| 2,660,919 | Kleinath | Dec. 1, 1953 |
| 2,672,787 | Schreiber | Mar. 23, 1954 |
| 2,737,099 | Chatman | Mar. 6, 1956 |